United States Patent [19]

Dischert et al.

[11] Patent Number: 5,227,883
[45] Date of Patent: Jul. 13, 1993

[54] METHOD AND APPARATUS FOR MOTION APERTURE CORRECTION

[76] Inventors: Lee R. Dischert, Rd1, Box 2006, Medford, N.J. 08055; Robert J. Topper, 131 Crooked Billet Rd., Hatboro, Pa. 19040

[21] Appl. No.: 753,601
[22] Filed: Aug. 30, 1991
[51] Int. Cl.$^5$ .............................................. H04N 5/208
[52] U.S. Cl. .................................... 358/160; 358/162; 358/166
[58] Field of Search ................. 358/160, 105, 166, 37, 358/162

[56] References Cited

U.S. PATENT DOCUMENTS

| | | | |
|---|---|---|---|
| 4,561,012 | 12/1985 | Acampora | 358/160 |
| 4,792,854 | 12/1988 | Glenn | 358/160 |
| 5,136,385 | 8/1992 | Campbell | 358/160 |

*Primary Examiner*—Mark R. Powell

[57] ABSTRACT

A method and apparatus for deriving a motion aperture signal that is added to a video signal to cause amplification of the high frequencies of the video signal during movement is disclosed. This method and apparatus operates with an interlaced scan television system by line interpolation of the fields adjacent to a present field of interest. One suggested interpolation means uses delay lines working in conjunction with a summer to vertically align adjacent fields with the field of interest. In order to match the amplitude response of the interpolation means operating on the adjacent fields and the amplitude response of the present field of interest, a filter is disclosed having the same delay line components as the interpolation means.

14 Claims, 3 Drawing Sheets

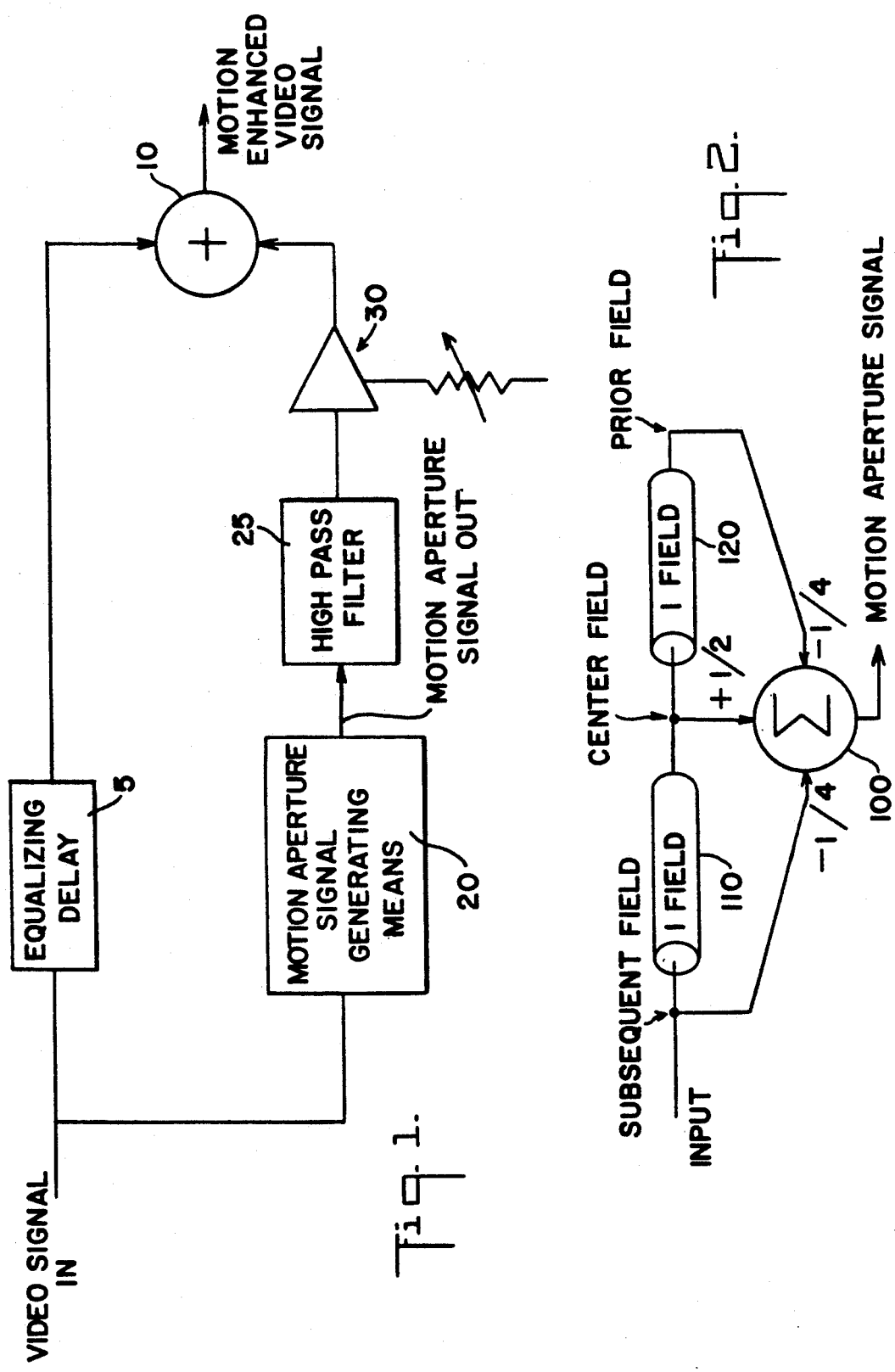

METHOD AND APPARATUS FOR MOTION APERTURE CORRECTION

FIELD OF INVENTION

This invention relates to a method and apparatus for correcting video signals made of sequential, interlaced fields for loss of high frequency information associated with a moving objects.

BACKGROUND OF THE INVENTION

Television cameras generate a video signal of an image. The video signal consists of individual lines. Each line, in turn, contains a sequence of intensity amplitudes of elements, or pixels, representing the intensity of the image at the location corresponding to each pixel.

Various standards exist as to how many lines are allocated for the creation of a sequence of television images. For example, in the United States, each video frame comprised in a television image contains two interlaced sets of 262½ lines, each set of 262½ lines is called a field. This current operating standard for television transmission in the United States is defined by the National Television Systems Committee (NTSC). This standard was approved for monochrome television transmission by the Federal Communications Commission in 1941 and further expanded for NTSC color television systems in 1954.

In this NTSC standard, the two sets of 262½ lines (or fields) are interlaced, i.e. their respective 262½ lines are interleaved so that each successive field occupies a vertical position half the vertical spacing between lines above or below the previous field. This means that the nth line in a field occupies a spacial position ½ line spacing above the (n+262)th line.

A video camera scanning an image needs a sample, or integration, time, for the acquisition of each pixel describing that image. The time to create a full frame of the image (consisting of two fields) is 1/30 second, each field of 262½ lines being generated every 1/60 second. Because of this integration time, moving pictures or objects whose position change within the 1/30 second time interval are blurred as if the image of a fast moving object were acquired with a still photography camera having a long exposure time.

Given the NTSC standard of image transmission as an example, the same area in a television image will be acquired every 1/60 second (every field) by the camera. Therefore, an object that has moved within 1/60 second will occupy different (vertical) positions in the sequence of fields. The object will therefore appear softer than the surrounding stationary areas that have not moved in the picture for multiple fields. The "spreading" of moving edges across horizontal or vertical pixels as compared to stationary objects will reduce its definition in a sequence of fields.

As described, when objects move within a sequence of video fields, they lose resolution or definition. This is objectionable in NTSC as well as in high definition television (HDTv) and other video images. A loss of image definition will be perceived greater whenever objects moving across the screen are being visually followed on the screen by the viewer. The loss of resolution or definition of the moving objects is due to the integration of the "high frequency" over an area of the scene and is referred to as "high-frequency roll-off".

One known method of reducing this loss of resolution is to reduce the integration time, i.e. reduce exposure time to acquire the image by the camera. This can be accomplished by using a shutter to reduce the exposure time as is done with still photography. Among other things, this is undesirable because it requires an increased amount of light necessary to operate the video camera thereby reducing its sensitivity.

It is therefore an object of the invention to provide a method and apparatus to equalize for the loss of resolution in a reproduced television signal caused by a movement of an object during the integration time of the video camera.

It is another object of the invention to provide a method and apparatus for creating a motion aperture signal that can be added to a video signal to enhance the high frequency loss of the video signal due to the effects of motion.

It is still another object of the invention to provide a non-adaptive method and apparatus for motion aperture correction utilizing a linear filter to enhance high frequency motion resolution of an interlaced video image.

SUMMARY OF THE INVENTION

This invention describes a motion aperture correction apparatus for enhancing moving objects in a television signal. The video signal has a sequence of interlaced fields, each of the interlaced fields having adjacent lines spaced at constant interline intervals. The motion aperture correction apparatus comprises:

(a) one or more first means for interpolating data between two adjacent lines of the video signal, each of these first means having a first output;

(b) one or more second means for delaying the sequence of alternating interlaced fields by a fixed time interval, each of these second means having a second output;

(c) summing means for summing one or more of the first outputs and one or more of the second outputs having a third output, this third output containing one or more frequencies indicative of motion in the video signal;

(d) combining means for adding the third output to the original television signal thereby enhancing said motion related signals in the television signal.

The motion aperture correction apparatus also includes a frequency selective means connected between the third output and the combining means to allow the selection of frequencies contained in the third output to be transmitted to the combining means. The motion aperture correction apparatus further includes an amplification means for amplifying one or more frequencies indicative of motion in the sequence of alternating fields making up the television signal.

In addition, the motion aperture correction apparatus has one or more means for interpolating data between two adjacent lines. This mechanism can be constructed of a one line delay line in parallel with an adder, where the line of interest is interpolated between the lines appearing at the input and output of the delay line.

The motion aperture correction apparatus also has one or more amplitude response matching means which matches the amplitude response of the second means to that of the interpolating means. In one embodiment of the invention, the amplitude response matching means comprises a low pass filter formed from delay lines and a summer.

In the motion aperture correction apparatus of the invention, the fixed time interval by which a field is delayed is about the same as the duration of one of the interlaced fields making up the television signal. The delay associated with one of the interpolating filters is the duration of one line within the field.

A motion aperture correction method for enhancing motion related signals in a television signal is also described, where the television signal has a sequence of interlaced fields. The motion aperture correction method includes the following steps:

(a) interpolating data between two or more lines to obtain interpolated data;

(b) delaying the video by one or more fixed time periods to obtain one or more delayed video signals;

(c) summing one or more of said interpolated data with one or more of the delayed video signals to generate a motion signal, this motion signal containing frequencies indicative of motion in the video signal;

(d) filtering the motion signal with a high pass filter thereby obtaining a peaking signal for enhancing the motion related signals when combined with the television signal.

A further step in the method includes that of gain adjusting the peaking signal prior to combining the correction signal with the original, unprocessed television signal.

The interpolating step comprises delaying the video by summing the delayed and undelayed lines to generate the interpolated video. Typically, when two taps, one line delay, are used for vertical interpolation, the delay is equivalent to ½ of a television line.

When the aperture correction method for enhancing motion related signals in a television signal is applied, it has been found that an additional step comprising the step of filtering of the center tap (one field delay) signal to approximate the amplitude response of the interpolating step to be beneficial. Also, it has been found that the video signal has to be delayed by an integral member of fields to achieve the results stated above.

The foregoing and other objectives, features and advantages of the invention will be more readily understood upon consideration of the following detailed description of certain preferred embodiments of the invention, taken in conjunction with the accompanying drawings and claims.

DESCRIPTION OF THE DRAWINGS

FIG. 1 is a block diagram of the motion aperture correction system of the present invention.

FIG. 2 is a block diagram of the motion aperture signal generation means.

DESCRIPTION OF THE PREFERRED EMBODIMENTS

Figure 3:
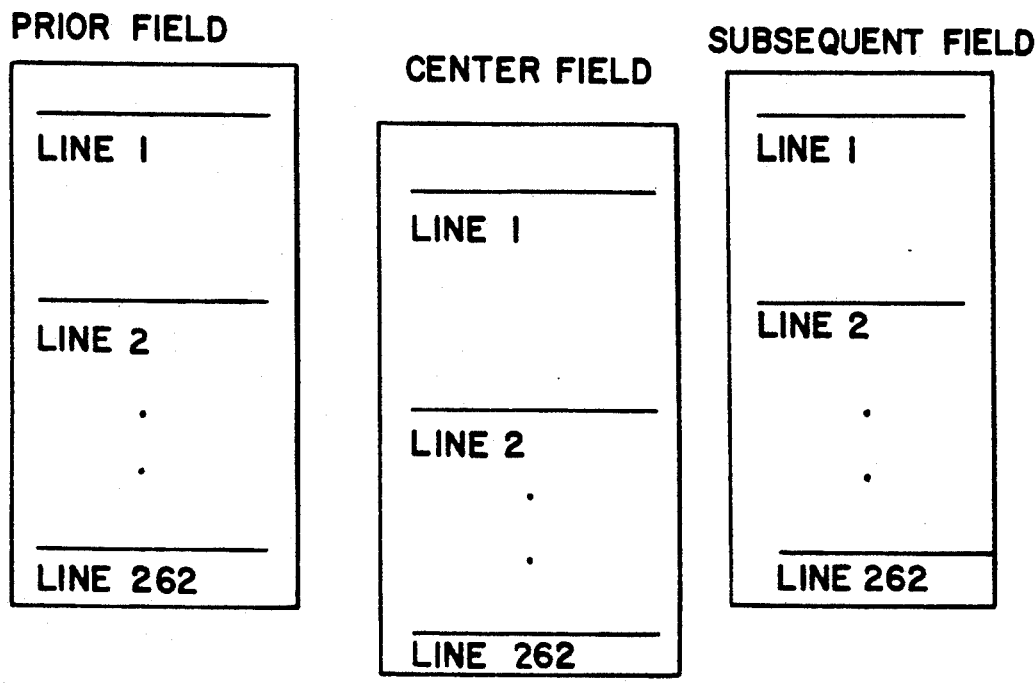
FIG. 3 illustrates the spacial misalignment of three successive fields inherent in a typical 2:1 interlaced transmissions, which misalignment is interpolated in the present invention.

FIG. 1 is a block diagram of the motion aperture detection/correction system of the present invention. In FIG. 1, an incoming video signal is input to adder 10 via equalizing delay 5 and is also input to motion aperture signal generator 20. Equalizing delay 5 compensates for known delays required to process the video signal in motion aperture signal generator 20, high pass filter 25 and amplifier 30. Equalizing delay 5 delays the video signal arriving at adder 10 from the video signal source.

When motion exists, motion aperture signal generator 20 outputs a signal indicative of this motion to gain adjustment means 30 via high pass filter 25. Gain adjustment means 30 outputs a correction signal to adder 10. The input video signal is combined at adder 10 with the gain corrected signal from amplifier 30 thereby correcting the video signal output to the video display. The gain of amplifier 30 is adjustable to achieve optimum image quality and compensate for high frequency loss.

Motion aperture signal generator 20 will now be described in detail. The first step in correcting for the effects of high frequency motion roll-off is the extraction of the "motion" or temporal frequencies contained within the signal. FIG. 2 is a block diagram of a high pass temporal filter (also known as an inverse raised cosine response filter) which can be used as a motion aperture signal generation means to recover the frequency components of motion contained within a television signal. In general terms, this tapped delay line filter subtracts the "center" field from its immediately adjacent fields, that is, the "prior" field and the "subsequent" field. As shown in FIG. 2, the incoming signal is input to subtractor 100 as well as one-field delay line 110. One-field delay line 120 is connected in series with delay line 110. The output of the first one-field delay line 110 is input to summing device 100 as well as to one-field delay line 120. The output from one field delay line 120 is also connected to the summing device 100.

This configuration achieves an arrangement wherein the video signal that has traveled both delay lines 110 and 120, the "oldest" field, can be considered as being the "prior" field to the "current" field. The "current" field (center field) is the one being currently corrected for high frequency roll-off and is delayed by 1 field by delay line 110. The field arriving behind the "current" field is the "subsequent" field, is at the input and has not yet passed through delay line 110.

Summing device 100 subtracts each pixel forming the adjacent fields ("prior" and "subsequent"), on either side of the "center" field (the present field of interest), from the corresponding pixels in the "center" field. That is, for each pixel in a field, ¼ of the amplitude of a similarly located pixel in the "prior field" and ¼ of the amplitude of the pixel of the "subsequent" field are subtracted from ½ of the "center" field.

Repeating this operation for all pixels in an image recovers frequency components of the field to field difference or motion of the incoming video signal. Assuming a continuous scene is being transmitted, characterized by a sequence of fields, if a difference due to motion or other differences exist between the center field and the two adjacent fields, summing device 100 outputs a pixel by pixel motion signal representative of motion or change in the scene. This output will be proportional to the frequency components related to the motion depicted in the sequence of the three fields, "prior", "center" and "subsequent". If there is no change, this indicates no movement or change in the picture and no motion signal is output.

In this case, the three fields involved can be generally described by having two frequency components. The first frequency component is relatively constant across the three fields corresponding to those characteristics of the signal that do not change from field to field. This is the part of the video signal associated with the stationary, non-moving object in the sequence of fields. The second frequency component is defined as corresponding to those characteristics of the field that did change between the three fields and is related to the moving objects.

If a certain proportion, such as ¼, of the "prior" and "subsequent" fields are subtracted from ½ of the "center" field, mathematically the "stationary" components of the three fields are cancelled while those components containing higher frequency components indicative of motion will not cancel and will be identified to subsequently enhance the signal.

A problem arises when filtering a 2:1 interlaced scanned television signal, as for example an NTSC signal. As previously described, and illustrated in FIG. 3, in a 2:1 interlaced scan television signal, the "prior" and "subsequent" fields adjacent to the "center" field are not vertically aligned with the center field, being interleaved in time and space either above or below the "center" field. Due to the ½ line vertical displacement of the fields, the lines and pixels within them are not aligned vertically field to field. Therefore, the strict application of the motion filter in FIG. 2 will also extract undesired frequencies related to the vertical shift of the image. These undesired frequencies will be output by the motion aperture signal 100 in FIG. 2 in addition to those desired frequencies of motion, and will be generated due to "motion" from the improper spacial vertical alignment of the center field with respect to its adjacent fields.

One approach to correcting this problem is to average the next and prior line in the "prior" or "subsequent"(adjacent) fields so that the result is vertically time aligned with the line on the present field of interest. This delaying and averaging can be viewed as a first approximation to an "interpolation" of the line into the proper vertical position or phase so that the vertical phase misalignment components do not appear at the output of the summer 100.

Figure 4:
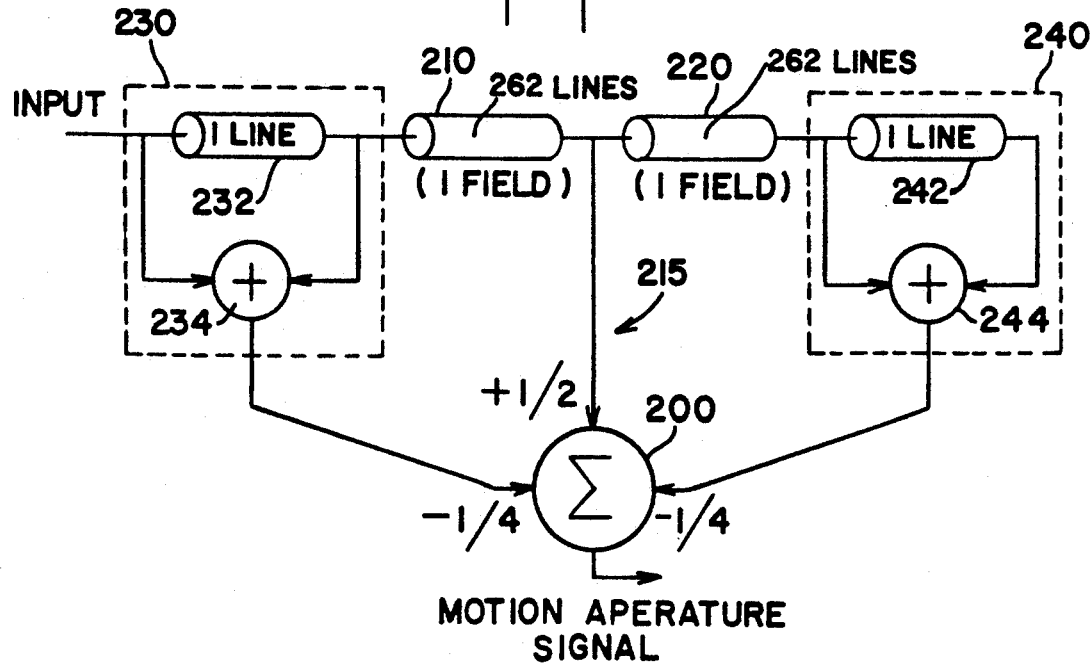
FIG. 4 is a motion aperture signal generation means with vertical phase correction in accordance with the present invention.

FIG. 4 illustrates a motion aperture signal generation means which provide the above-mentioned ½ line correction relating to 2:1 interlaced systems, such as an NTSC system. In FIG. 4, four delay lines 230, 210, 220, and 240 are arranged in series. Delay lines 210 and 220 each provide a "262½ line" (one field) delay, delay lines 232 and 242 each provide a "one line" delay. The "center" field is made by delay lines 230 and 210 for a total of 263 lines. Therefore, output signal 215 is delayed 263 lines behind the input signal. Signal 215 is input to summing device 200. After being further delayed by delay line 220 and processed by interpolator 240, the center field is also input to summing device 200.

Line interpolator 230 includes one line delay 232 connected to 262 line delay 210. Line interpolator 240 is connected to 262 line delay line 220. Line interpolator 230 comprises, for example, a one line delay means 232 in parallel with adder 234, forming a two-tap delay line comb filter. Adder 234 averages pixel values in adjacent lines. The resulting signal from adder 234 is the sum of the value of the amplitude of each pixel from two adjacent lines. Similarly, the second line interpolator comprises one delay 242 in parallel with adder 244, also forming a two-tap delay line comb filter. Line interpolators 230 and 240 interpolate the missing line of each adjacent field (the lines between the interlaced lines) by taking a line above and below the needed vertical position and then averaging the two lines. The average value can be viewed as an intermediate line position shift between the lines now spacially aligned with the lines in the center field. The result is a net phase change for the line, correcting the vertical displacement problem.

In the circuit of FIG. 4, the lines in the adjacent fields are spacially compensated while the "center" field output 215 is left essentially unchanged, except for its 263 line delay with respect to the incoming signal. The two-tap delay line comb filters comprising interpolators 230 and 240 have a non-raised cosine response, while the uncombed center field 215 has a flat amplitude response, being unfiltered. When the responses of a flat and a raised cosine filter are summed (subtracted by summer 200 of FIG. 4) the result may have a slight amplitude error because the frequency content of the signals being summed is different.

Figure 5:
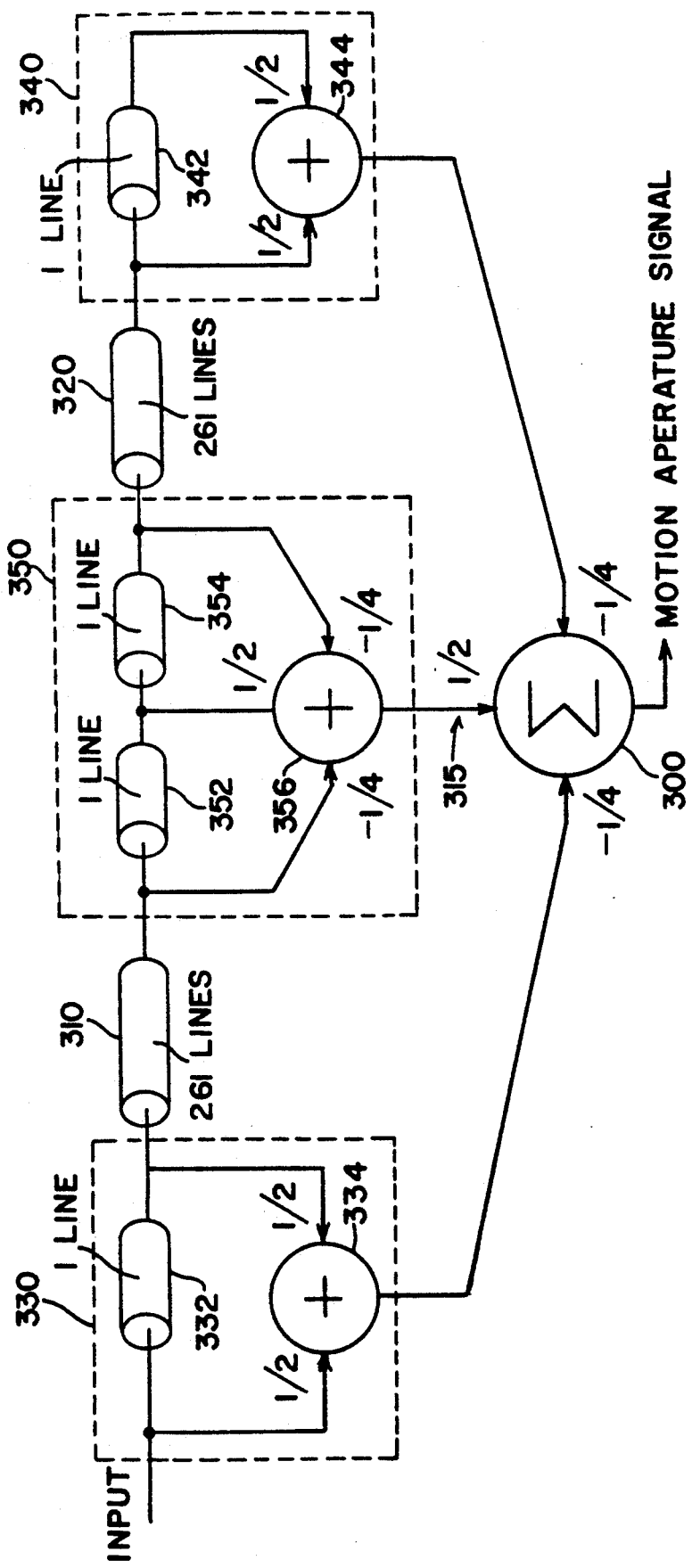
FIG. 5 is a block diagram of a preferred embodiment of a motion aperture generation means in accordance with the present invention.

FIG. 5 is a block diagram of a motion aperture signal generation means for compensating for the amplitude error present in the circuit shown in FIG. 4. In FIG. 5, a three-tap, two-line low-pass comb filter 350 is used to process the "center" field of FIG. 4 and provides an output 315 to match it more closely with the interpolated outputs of interpolators 330 and 340. Interpolators 330 and 340 operate as in FIG. 4. Comb filter 350 comprises one line delays 352 and 354 and adder 356 coupled as shown in FIG. 5. The frequency spectrum of output 315 represents the "center" field, multiplied by the frequency response of the filter created by the two delay lines 352 and 354 operating in conjunction with the video signal flowing through them. The response of this filter is a raised cosine response. A raised cosine filter is of the type represented by a frequency response given by:

$$A = \tfrac{1}{2} + \tfrac{1}{2} \cos(2\pi fT)$$

where: A is amplitude response; $2\pi f$ is the frequency in radians; and T is the length of the time delay of the delay line.

Note that because of their structure, interpolators 330 and 340 form a filter of characteristic transfer function more similar to that of filter 350, i.e., they have better matched frequency responses. Because signal 315 has been subjected to a filter having a similar structure, and therefore, response to that output by adders 344 and 334 (part of interpolators 340 and 330 respectively), the combed center tap output signal 315 will be a raised cosine response, approximating the response of the end taps more closely than the non-combed center field of FIG. 4. The resulting motion aperture signal is gain modified and added back into the original signal using adder 10 (FIG. 1).

The operation of the circuit of FIG. 5 is now further described. The incoming video signal is input to interpolator 330, which, in this example, is a two-tap (one line delay) low-pass comb filter. Interpolator 330 has two outputs. The first output is from summing device 334 and represents a vertical delay of the incoming signal of half a field line. The second output of interpolator 330 is the video signal delayed one line by delay 332. The one line delayed signal is input to a 261-line delay line 310. Delay lines 310 and 332 produce a total of a 262 line delay from the input of interpolator 330 to the input of comb filter 350.

The output of delay line 310 is input to three-tap (two delay line) low-pass comb filter 350. Filter 350 consists of two one line delay lines 352 and 354 in series, and a summer 56. Summer 356 sums the input to delay line 352, the output of delay line 352 (input to 354), and output of delay line 354, and outputs the result of the summation. The output of delay line 54 is input to 261-line delay line 320. The output of delay line 320 is input to interpolator 340, which serves the same function as comb filter 330 previously described (outputting a ½-line vertical delayed signal to adder 300 by outputting a output vertical delayed signal from delay 342).

The outputs of interpolator 330 and 340, and comb filter 350 are comb filtered signals. Summing device 300 sums the three comb filtered signals to produce the motion signal The inputs to summing device 300 are amplitude weighted for inverted raised cosine response (minus ¼ from combs 330 and 40 and plus ½ from comb 350). Since two adjacent fields are being subtracted from the center field, the two fields must be weighed or gain adjusted each to ½ of the center field. Other coefficients can also be used by summer 300 (e.g., −½, 1, −½ or −1, 2, −1), but at certain frequencies the output using these other coefficient would be greater than the desired unity gain.

The "vertical" delays of the outputs of the interpolators 330 and 340 are identical, being ½ line displaced in their respective inputs By averaging the two adjacent lines to the current line in filter 350, the output 315 is aligned vertically with the delayed outputs of interpolators 330 and 340. In this configuration, the outputs from interpolators 330 and 340 subtract the adjacent fields from the "center" field, producing no signal for still pictures and producing a signal for changes or motion in a sequence of fields. In interpolators 330 and 340, the coefficients related to summing devices 334 and 344, respectively, are ½ and ½. A typical example of a one line delay element that can be used for delay element 332 is Nippon Electric Co. part number uPD 41101. A 261 line delay element such as delay lines 310 and 320 can be implemented from Texas Instruments' part number TMS4C1050.

Referring back to FIG. 1, the motion aperture signal from motion aperture generating means 20 is high-pass filtered to amplify the desired frequencies and added to the original video signal on a pixel by pixel basis at a preferred gain by adder 10. The high-pass filter eliminates some motion of the signal while enhancing the preferred "lost" high frequencies.

The same derivation of the motion aperture signal can be extended to operate on only two adjacent fields in the event using the information in three consecutive fields for motion aperture correction is inconvenient. The motion signal components derived from delay lines implementing comb filters will have to be scaled differently (+½, −½) since only two signals are combined instead of three. Conversely, more than three fields can be used to derive the motion compensation signal by applying the same concepts. The derivation of the motion signal was illustrated from three consecutive fields because it experimentally provided the best results.

Although the present invention has been shown and described with respect to preferred embodiments, various changes and modifications which are obvious to persons skilled in the art of which the invention pertains are deemed to lie within the spirit and scope of the invention. For example, two or more than 3 fields may be delayed in the manner similar to the one shown to derive a motion signal having essentially the same qualities. Thus numerous changes and modifications can be made while staying within the scope of the invention which is set forth in the appended claims.

We claim:

1. A motion aperture correction apparatus for enhancing motion related signals in a television signal, said television signal having a sequence of interlaced fields, each of said interlaced fields having adjacent lines spaced at constant interline intervals, said motion aperture correction apparatus comprising:
   one or more interpolators for interpolating the content of said television signal between two adjacent lines spaced at constant line intervals in a sequence of said interlaced fields, each of said interpolators producing a first output signal;
   one or more delay lines for delaying said sequence of interlaced fields by a fixed time interval, each of said delay lines providing a second output signal;
   summing means for summing one or more of said first output signal and one or more of said second output signals to produce a third output, said third output signal containing one or more frequencies indicative of motion in said sequence of interlaced fields; and
   combining means for adding said third output signal to said television signal thereby enhancing said motion related signals in said television signal.

2. A motion aperture correction apparatus as recited in claim 1 further comprising a frequency selective means connected between said third output and said combining means to allow a selection of said one or more frequencies indicative of motion contained in said third output to be transmitted to said combining means.

3. A motion aperture correction apparatus as recited in claim 2 further comprising an amplification means for amplifying said one or more frequencies indicative of motion in said sequence of alternating fields.

4. A motion aperture correction apparatus as recited in claim 1 wherein said one or more first means for interpolating data between two said adjacent lines comprises a one line delay line in parallel with an adder.

5. A motion aperture correction apparatus as recited in claim 1 further comprising one or more means for amplitude response matching for matching the amplitude response of said second output signals to that of said first output signals.

6. A motion aperture correction apparatus as recited in claim 5 wherein said amplitude response matching means comprise a low pass filter formed from delay lines and a summer.

7. A motion aperture correction apparatus as recited in claim 1 wherein said fixed time interval is the same as the duration of one of said interlaced fields.

8. A motion aperture correction method for enhancing motion related signals in a television signal, said television signal having a sequence of interlaced fields, each of said interlaced fields having adjacent lines spaced at constant interline intervals, said motion aperture correction method comprising the steps of:
   interpolating data between two said adjacent lines spaced at constant line intervals in a sequence of said interlaced fields to obtain interpolated data;
   delaying said sequence of interlaced fields by one or more fixed time periods to obtain one or more delayed television signals;
   summing one or more of said interpolated data with one or more of said delayed television signals to generate a correction signal, said correction signal containing one or more frequencies indicative of motion in said sequence of interlaced fields;

combining said correction signal with said television signal thereby obtaining a signal for enhancing said motion related signals in said television signal.

9. A motion aperture correction method for enhancing motion related signals in a television signal as recited in claim 8, further comprising the step of selecting frequencies of interest from said correction signal prior to combining said correction signal with said television signal.

10. A motion aperture correction method for enhancing motion related signals in a television signal as recited in claim 9 further comprising the step of amplifying said selected frequencies of interest from said correction signal prior to combining said correction signal with said television signal.

11. A motion aperture correction method for enhancing motion related signals in a television signal as recited in claim 8 wherein said interpolating step comprises delaying said adjacent lines in said sequence of interlaced fields by a fixed time period and subsequently summing said lines.

12. A motion aperture correction method for enhancing motion related signals in a television signal as recited in claim 8 further comprising the step of filtering of said one or more delayed television signal to closely approximate the amplitude response of said interpolating step.

13. A motion aperture correction method for enhancing motion related signals in a television signal as recited in claim 8 wherein said delaying of said sequence of interlaced fields is as long as the duration of one or more of said interlaced fields.

14. A system for enhancing the quality of a video signal generated by a video camera, said video signal having a sequence of interlaced fields, comprising:

motion aperture signal generator responsive to said video signal for producing an output signal indicative of movement in an image represented by said sequence of adjacent fields, said motion aperture signal generator means including means for comparing adjacent fields to produce an output signal indicative of changes in the high frequency components of the video signal in adjacent fields and means for combining said output signal with said video signal to produce a motion enhanced video signal.

* * * * *